US010776909B2

(12) United States Patent
Ikeda et al.

(10) Patent No.: US 10,776,909 B2
(45) Date of Patent: Sep. 15, 2020

(54) DEFECT INSPECTION APPARATUS, DEFECT INSPECTION METHOD, AND NON-TRANSITORY COMPUTER READABLE MEDIUM

(71) Applicant: OMRON Corporation, Kyoto (JP)

(72) Inventors: Yasuyuki Ikeda, Moriyama (JP); Masashi Kurita, Kizugawashi (JP)

(73) Assignee: OMRON Corporation, Kyoto (JP)

( * ) Notice: Subject to any disclaimer, the term of this patent is extended or adjusted under 35 U.S.C. 154(b) by 16 days.

(21) Appl. No.: 16/129,818

(22) Filed: Sep. 13, 2018

(65) Prior Publication Data

US 2019/0147586 A1 May 16, 2019

(30) Foreign Application Priority Data

Nov. 15, 2017 (JP) ................................ 2017-219594

(51) Int. Cl.
*G06T 7/00* (2017.01)
*G06K 9/46* (2006.01)

(52) U.S. Cl.
CPC .......... *G06T 7/0004* (2013.01); *G06K 9/4628* (2013.01); *G06T 7/0008* (2013.01); *G06K 2209/19* (2013.01); *G06T 2207/20081* (2013.01); *G06T 2207/20084* (2013.01); *G06T 2207/30164* (2013.01)

(58) Field of Classification Search
CPC ................ G06T 7/0004; G06T 7/0008; G06T 2207/20081; G06K 9/4628; G06K 2209/19
USPC .......................................................... 382/157
See application file for complete search history.

(56) References Cited

U.S. PATENT DOCUMENTS

2001/0041018 A1* 11/2001 Sonoda .................... G06T 5/20 382/275
2011/0274362 A1 11/2011 Isomae et al.
(Continued)

FOREIGN PATENT DOCUMENTS

JP 2003317082 11/2003
WO 2016201947 12/2016

OTHER PUBLICATIONS

"Search Report of Europe Counterpart Application", dated Mar. 21, 2019, p. 1-p. 12.

(Continued)

*Primary Examiner* — Ayodeji O Ayotunde
(74) *Attorney, Agent, or Firm* — JCIPRNET

(57) ABSTRACT

The disclosure includes: a memory section, storing a learned model and an internal parameter set in the learned model; an acquisition section, acquiring an image of an inspection object photographed under predetermined conditions; a preprocessing section, generating a predetermined preprocessing filter according to a feature value in a preprocessing image being an image of the inspection object that is acquired by the acquisition section and that includes a defect, and a feature value corresponding to the internal parameter, and generating a preprocessed image by applying the generated preprocessing filter to an inspection image being an image of the inspection object that is acquired by the acquisition section and converting the inspection image; and an inspection section, inspecting the preprocessed image for presence or absence of the defect of the inspection object by using the stored learned model.

16 Claims, 15 Drawing Sheets

Database apparatus
12
1
10
PLC
8
104
100
Defect inspection apparatus
CNN engine
Input image
102
108
106
2
4
6

(56) References Cited

U.S. PATENT DOCUMENTS

2013/0195345 A1* 8/2013 Nammoto ............... G06T 7/001
382/141
2017/0262962 A1* 9/2017 Rad ......................... G06F 17/18
2018/0253836 A1* 9/2018 Huang ................. G06K 9/4628

OTHER PUBLICATIONS

Max Jaderberg, et al., "Spatial Transformer Networks," Feb. 4, 2016, Available at: https://arxiv.org/pdf/1506.02025.pdf.

* cited by examiner

DEFECT INSPECTION APPARATUS, DEFECT INSPECTION METHOD, AND NON-TRANSITORY COMPUTER READABLE MEDIUM

CROSS-REFERENCE TO RELATED APPLICATION

This application claims the priority benefit of Japan Application No. 2017-219594, filed on Nov. 15, 2017. The entirety of the above-mentioned patent application is hereby incorporated by reference herein and made a part of this specification.

BACKGROUND

Technical Field

The disclosure relates to a defect inspection apparatus, a defect inspection method, and a program thereof, capable of executing defect detection processing using a convolutional neural network (CNN).

Related Art

In the field of factory automation (FA), automatic control using image measurement processing has been widely put into practical use. For instance, by imaging an object to be inspected such as a workpiece or the like and calculating a feature value of a defect or the like from an image obtained by the imaging, a process of inspecting whether the workpiece is qualified or not is realized. In order to realize such a process, teacher data corresponding to a desired workpiece needs to be prepared in advance and be learned by an identifier.

For instance, in Patent Document 1 (Japanese Patent Application Laid-open No. 2003-317082), a classification assisting apparatus is disclosed providing an efficient environment that assists in classifying an image of an inspection object. The classification assisting apparatus described in Patent Document 1 includes: a display section displaying an image; an input section receiving an input classifying the image of the inspection object; and a processing section, based on imaging positions where a plurality of inspection objects indicated by a plurality of previously prepared images of the inspection objects were imaged, determining the order of the inspection objects, and arranging and displaying the images of the inspection objects on the display section according to the order.

In the field of FA, inspection conditions, such as type of workpiece flowing on a production line, or type of defect to be detected, photographing conditions and so on, vary from production line to production line. Accordingly, when an identifier that has undergone pre-learning is commonly and universally used in various inspection conditions by using the technique as described in Patent Document 1, depending on different inspection conditions for each production line, a defect may be overlooked. Meanwhile, when causing the identifier to learn according to the production line, as the inspection conditions such as type of workpiece and so on are changed, time is required for reconstructing the identifier and productivity may be reduced.

SUMMARY

The disclosure has the following configuration.

That is, a defect inspection apparatus according to an aspect of the disclosure includes: a memory section, storing a learned model and an internal parameter set in the learned model; an acquisition section, acquiring an image of an inspection object photographed under predetermined conditions; a preprocessing section, generating a predetermined preprocessing filter according to a feature value in a preprocessing image being an image of the inspection object that is acquired by the acquisition section and that includes a defect, and a feature value corresponding to the internal parameter, and generating a preprocessed image by applying the generated preprocessing filter to an inspection image being an image of the inspection object that is acquired by the acquisition section and converting the inspection image; and an inspection section, inspecting the preprocessed image for presence or absence of the defect of the inspection object by using the stored learned model.

In addition, in a defect inspection method according to an aspect of the disclosure, a computer executes the following steps. A learned model and an internal parameter set in the learned model are stored. An image of an inspection object photographed under predetermined conditions is acquired. A predetermined preprocessing filter is generated according to a feature value in a preprocessing image being an image of the inspection object that is acquired in the step of acquiring and that includes a defect, and a feature value corresponding to the internal parameter. A preprocessed image is generated by applying the generated preprocessing filter to an inspection image being an image of the inspection object acquired in the step of acquiring and converting the inspection image. The preprocessed image is inspected for presence or absence of the defect of the inspection object by using the stored learned model.

In addition, in a program stored on a non-transitory computer readable medium according to an aspect of the disclosure, a computer functions as: a unit for storing a learned model and an internal parameter set in the learned model; a unit for acquiring an image of an inspection object photographed under predetermined conditions; a unit for generating a predetermined preprocessing filter according to a feature value in a preprocessing image being an image of the inspection object that is acquired by the unit for acquiring and that includes a defect, and a feature value corresponding to the internal parameter, and for generating a preprocessed image by applying the generated preprocessing filter to an inspection image being an image of the inspection object that is acquired by the unit for acquiring and converting the inspection image; and a unit for inspecting the preprocessed image for presence or absence of the defect of the inspection object by using the stored learned model.

DESCRIPTION OF THE EMBODIMENTS

Figure 1:
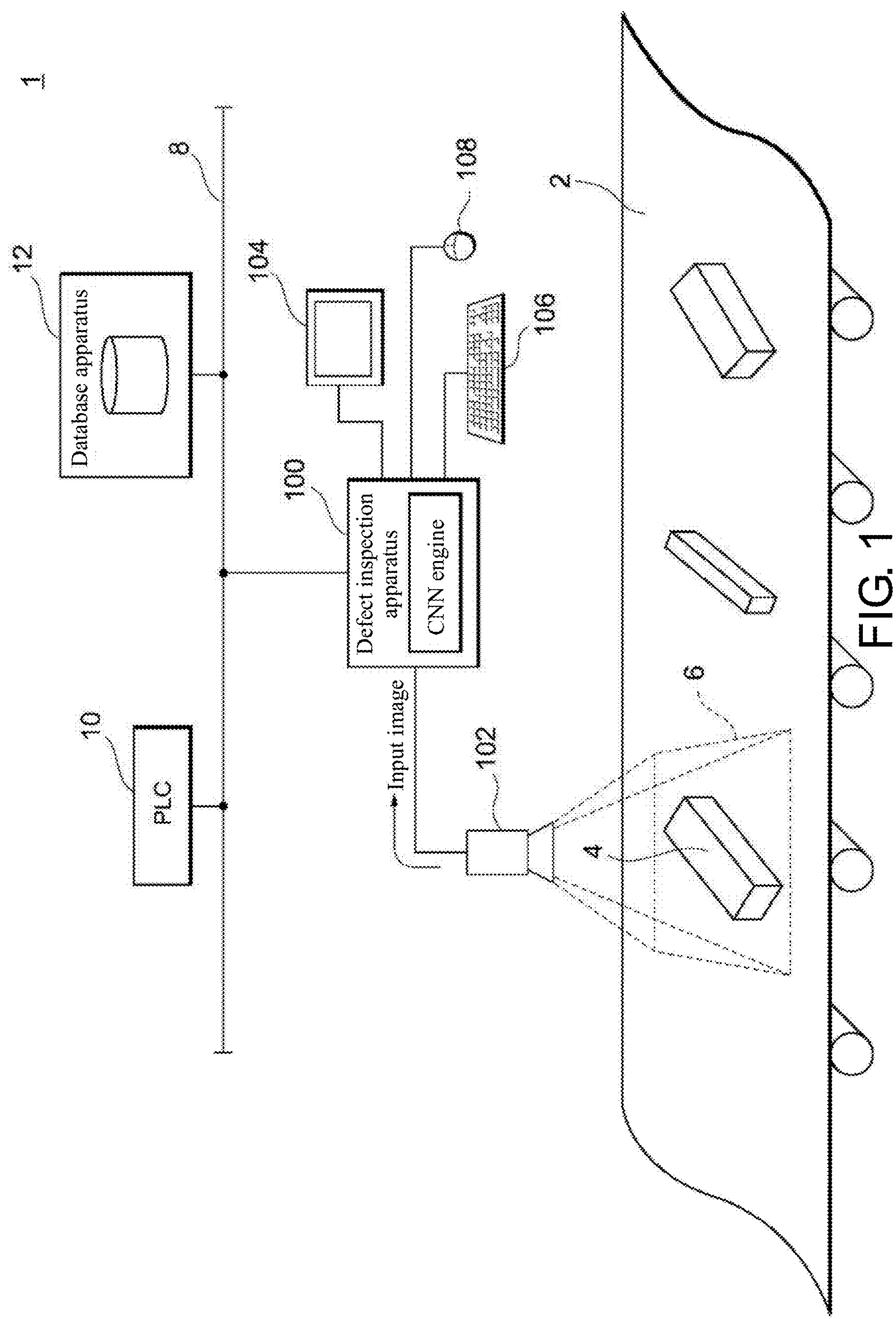
FIG. 1 is a schematic diagram showing a system configuration example of a defect inspection system according to the present embodiment.

An embodiment (hereinafter also written as "the present embodiment") according to an aspect of the disclosure is hereinafter explained based on the drawings. However, the present embodiment explained below is merely an example of the disclosure in all respects. It goes without saying that various improvements or modifications can be made without departing from the scope of the disclosure. That is, when implementing the disclosure, a specific configuration corresponding to the embodiment may be properly adopted. Moreover, data appearing in the present embodiment are described using a natural language but are more specifically specified by computer-recognizable pseudolanguage, commands, parameters, machine language and so on.

The disclosure provides a technique capable of flexibly utilizing an identifier that has undergone pre-learning according to an image of an inspection object or a background image.

The embodiments of the disclosure have the following configuration.

That is, a defect inspection apparatus according to an aspect of the disclosure includes: a memory section, storing a learned model and an internal parameter set in the learned model; an acquisition section, acquiring an image of an inspection object photographed under predetermined conditions; a preprocessing section, generating a predetermined preprocessing filter according to a feature value in a preprocessing image being an image of the inspection object that is acquired by the acquisition section and that includes a defect, and a feature value corresponding to the internal parameter, and generating a preprocessed image by applying the generated preprocessing filter to an inspection image being an image of the inspection object that is acquired by the acquisition section and converting the inspection image; and an inspection section, inspecting the preprocessed image for presence or absence of the defect of the inspection object by using the stored learned model. Moreover, the internal parameter of the learned model is information expressing the learned model. If taking a neural network (hereinafter also simply "network") as an example of the learned model, the internal parameter shows information regarding number of layers of the neural network, number of nodes relating to each layer, weight parameters of links connecting between the nodes, bias parameters relating to each node and function forms of activation functions relating to each node. A feature value that should be detected as a defect is defined by the internal parameter. In addition, the preprocessing image is an input image input to the defect inspection apparatus, and is an object image from which a feature value for generating the preprocessing filter is extracted. The preprocessing image is the image of the inspection object that includes the defect, and may be selected by a user or by the defect inspection apparatus itself. In addition, the inspection image is the input image acquired by the defect inspection apparatus, and is an image becoming the inspection object in an actual inspection process.

In the above configuration, the preprocessing filter converting the inspection image used in the actual inspection process can be generated according to the defect becoming the inspection object. Accordingly, the learned model that has been constructed in advance can be universally utilized according to the inspection object or background image.

In the defect inspection apparatus according to the above aspect, the preprocessing section may be configured to generate the preprocessing filter for converting the preprocessing image so that a width of the feature value of a defective region in the preprocessing image that includes the defect is included in a range of the feature value corresponding to the internal parameter. That is, the range of the feature value corresponding to the internal parameter is determined depending on the type of defect included in learning data utilized in generating the learned model. Accordingly, when a defect having a unique feature not included in the learning data occurs in the production line, a feature value of the defect may deviate from the feature value obtained by pre-learning, and misrecognition (overlooking) may occur. However, according to the configuration, it can be prevented that a defect having a feature value deviating from the internal parameter obtained by the learned model by pre-learning is overlooked.

In addition, in the defect inspection apparatus according to the above aspect, the preprocessing section may be configured to generate the preprocessing filter for converting the preprocessing image so that a width of a pattern of a background region other than the defective region in the preprocessing image deviates from the range of the feature value corresponding to the internal parameter. That is, the range of the feature value corresponding to the internal parameter is determined depending on the type of defect included in learning data utilized in generating the learned model. Accordingly, when a pattern of the background region having a unique feature not included in the learning data occurs in the production line, the pattern of the background region may match the range of the feature value obtained by pre-learning, and misrecognition (excessive inspection) may occur. According to the configuration, false detection (excessive inspection) can be prevented from occurring in the case where an image feature that is not a defect falls within the feature value that can be detected by the internal parameter obtained by pre-learning.

In addition, in the defect inspection apparatus according to the above aspect, the preprocessing section may be configured to receive from outside a designation of the defective region in the preprocessing image and to generate the preprocessing filter based on the received defective region. Furthermore, the preprocessing section may be configured to generate the preprocessing filter enlarging or reducing the preprocessing image based on the defective region. Furthermore, the preprocessing section may be configured to cause a portion of the preprocessing image that includes at least the defective region to change according to a plurality of enlargement/reduction ratios and to generate a feature detection image with respect to at least the portion, and to generate the preprocessing filter enlarging or reducing the preprocessing image according to the enlargement/reduction ratio when a difference between a density of the feature detection image within the defective region and a density of the feature detection image outside the defective region is the greatest when changing with the enlargement/reduction ratios. The feature detection image may be displayed in variable density so that the density of a region indicating a feature corresponding to the internal parameter is larger as compared with other regions.

In addition, in the defect inspection apparatus according to the above aspect, the preprocessing section may be configured to generate the preprocessing filter flattening brightness of the preprocessing image. According to the configuration, by generating the preprocessing filter according to the inspection process, the learned model that has been constructed in advance can be universally utilized.

In addition, the defect inspection apparatus according to the above aspect may be configured to further include a display section displaying the preprocessed image. Furthermore, the display section may be configured to display the preprocessed image and a detection result image from which the defect is extracted in a manner enabling comparison. According to the configuration, since an intermediate image after preprocessing is presented to the user, when the user confirms a measurement result image, they can grasp whether false detection of a defect is due to an error of the learned model or due to noise caused by preprocessing.

In addition, the defect inspection apparatus according to the above aspect may be configured to include an input section receiving a user selection of the preprocessing image used for generating the preprocessing filter from the image of the inspection object that is acquired by the acquisition section and that includes the defect, wherein the preprocessing section may be configured to generate the predetermined preprocessing filter according to the feature value in the preprocessing image and the feature value corresponding to the internal parameter. According to the configuration, an image deviating from the internal parameter and for generating the preprocessing filter can be properly selected.

In addition, the defect inspection apparatus according to the above aspect may be configured to include a sequence input section receiving a user selection of which of a plurality of processing sequences is to be executed, wherein the processing sequences are configured to include a preparation process sequence in which the preprocessing section generates the preprocessing filter and an operation process sequence in which the generated preprocessing filter is applied to the inspection image to inspect presence or absence of the defect included in the inspection object. Furthermore, in the above operation process sequence, it may be configured to execute processing that updates the preprocessing filter by the preprocessing section according to content of an inspection result regarding whether or not the defect of the inspection object can be identified. According to the configuration, since the preprocessing filter is properly updated according to the inspection result, the rate of occurrence of false detection or non-detection can be further reduced.

In addition, in a defect inspection method according to an aspect of the disclosure, a computer executes the following steps. A learned model and an internal parameter set in the learned model are stored. An image of an inspection object photographed under predetermined conditions is acquired. A predetermined preprocessing filter is generated according to a feature value in a preprocessing image being an image of the inspection object that is acquired in the step of acquiring and that includes a defect, and a feature value corresponding to the internal parameter. A preprocessed image is generated by applying the generated preprocessing filter to an inspection image being an image of the inspection object acquired in the step of acquiring and converting the inspection image. The preprocessed image is inspected for presence or absence of the defect of the inspection object by using the stored learned model.

In the above configuration, the preprocessing filter converting the inspection image used in the actual inspection process can be generated according to the defect becoming the inspection object. Accordingly, the learned model that has been constructed in advance can be universally utilized according to the inspection object or background image.

In addition, in a program stored on a non-transitory computer readable medium according to an aspect of the disclosure, a computer functions as: a unit for storing a learned model and an internal parameter set in the learned model; a unit for acquiring an image of an inspection object photographed under predetermined conditions; a unit for generating a predetermined preprocessing filter according to a feature value in a preprocessing image being an image of the inspection object that is acquired by the unit for acquiring and that includes a defect, and a feature value corresponding to the internal parameter, and for generating a preprocessed image by applying the generated preprocessing filter to an inspection image being an image of the inspection object that is acquired by the unit for acquiring and converting the inspection image; and a unit for inspecting the preprocessed image for presence or absence of the defect of the inspection object by using the stored learned model.

In the above configuration, the preprocessing filter converting the inspection image used in the actual inspection process can be generated according to the defect becoming the inspection object. Accordingly, the learned model that has been constructed in advance can be universally utilized according to the inspection object or background image.

According to the disclosure, a technique can be provided capable of flexibly utilizing an identifier that has undergone pre-learning according to an inspection object or a background image.

§ 1 Application Example

First of all, an example of a situation in which the disclosure is applied is explained using FIG. 1. FIG. 1 is a schematic diagram of an example of a situation of applying a defect inspection system 1 according to the present embodiment. The defect inspection system 1 according to the present embodiment performs preprocessing on an input image generated by imaging an object to be inspected, so as to be able to perform proper defect inspection based on a learned model. The object to be inspected includes, for instance, a workpiece such as a component, a product or the like in a manufacturing process.

As shown in FIG. 1, for instance, by executing image measurement processing on an input image obtained by imaging a workpiece 4 conveyed on a belt conveyor 2 and being the object to be inspected, the defect inspection system 1 realizes appearance inspection or appearance measurement of the workpiece 4. In the following explanation, as a typical example of the image measurement processing, an inspection of presence or absence of a defect on a surface of the workpiece 4 or the like is explained as an application example. However, the disclosure is not limited thereto, and can also be applied in identification of the type of the defect or measurement of appearance and shape of the defect, or the like.

A camera 102 being an imaging section is arranged above the belt conveyor 2, and an imaging visual field 6 of the camera 102 is configured to include a predetermined region on the belt conveyor 2. Image data (an example of an inspection image, hereinafter also referred to as "input image") generated by imaging by the camera 102 is sent to a defect inspection apparatus 100. The imaging by the camera 102 is executed in a periodic manner or an event-like manner.

The defect inspection apparatus 100 is connected to a programmable logic controller (PLC) 10 and a database apparatus 12 or the like via an upper network 8. A measurement result in the defect inspection apparatus 100 may be sent to the PLC 10 and/or the database apparatus 12. Moreover, in addition to the PLC 10 and the database apparatus 12, an arbitrary apparatus may be connected to the upper network 8.

The defect inspection apparatus 100 may be connected to a display 104 for displaying a state during processing or the measurement result or the like, as well as a keyboard 106 and a mouse 108 as an input section receiving a user operation.

The defect inspection apparatus 100 has a CNN engine. The CNN engine constitutes an identifier using a convolutional neural network, and by using the CNN engine, a feature detection image for each predetermined number of classes (classifications) is generated from the input image. Based on one or a plurality of feature detection images that are generated, presence or absence of a defect in an object workpiece or the like is determined. Alternatively, the size or position of the defect or the like can also be detected.

The CNN engine included in the defect inspection apparatus 100 performs learning based on a predetermined feature detection image (hereinafter also "learning image") for teacher data, thereby obtaining in advance, as an internal parameter, an image feature value that should be detected as a defect.

At this moment, since there is a limit to a data set that can be prepared as the learning image, the range of the feature value of the defect that can be detected by the obtained internal parameter may be limited. That is, a defect having such a feature value that deviates from the feature of the defect included in the set of the learning image cannot be detected by the CNN engine that learned using such set of learning image.

Meanwhile, at an actual production site, type of workpiece flowing on a production line, or photographing conditions, type of defect to be detected and so on, vary from production line to production line. For instance, the photographing conditions when the learning image is taken do not necessarily match the photographing conditions in an actual inspection process. Accordingly, in view of diversity of production lines, it can be said that a CNN engine that has undergone pre-learning is not necessarily highly versatile. However, it is inefficient to construct a CNN engine for each production line for reasons such as that specifications of production lines are frequently changed.

In view of the above, the defect inspection apparatus 100 according to the present embodiment applies a preprocessing filter converting the input image so that a defect can be properly detected using the internal parameter obtained by the CNN engine by pre-learning. Accordingly, the CNN engine that has undergone pre-learning can be improved in versatility, and can be flexibly utilized in various production lines according to the inspection object or the background image. In addition, by applying the preprocessing filter, a work coverage of the defect inspection apparatus 100 increases, i.e., the types or quantity of the workpiece 4 that can be inspected by the defect inspection apparatus 100 increases.

Moreover, in the following explanation, an example is explained where the preprocessing filter is generated in advance based on a user selected input image when the inspection process is launched. However, the timing of generating the preprocessing filter is not limited to the time of launch of the inspection process, but may be an arbitrary timing such as replacement time of the camera 102, or the like. Moreover, in the following explanation, a launch process of the inspection process is referred to as a preparation process, and a process that is subsequent to the preparation process and that actually performs inspection is referred to as an operation process.

§ 2 Configuration Example

<1. Hardware Configuration of Defect Inspection Apparatus 100>

Next, a hardware configuration of the defect inspection apparatus 100 included in the defect inspection system 1 according to the present embodiment is explained.

Figure 2:
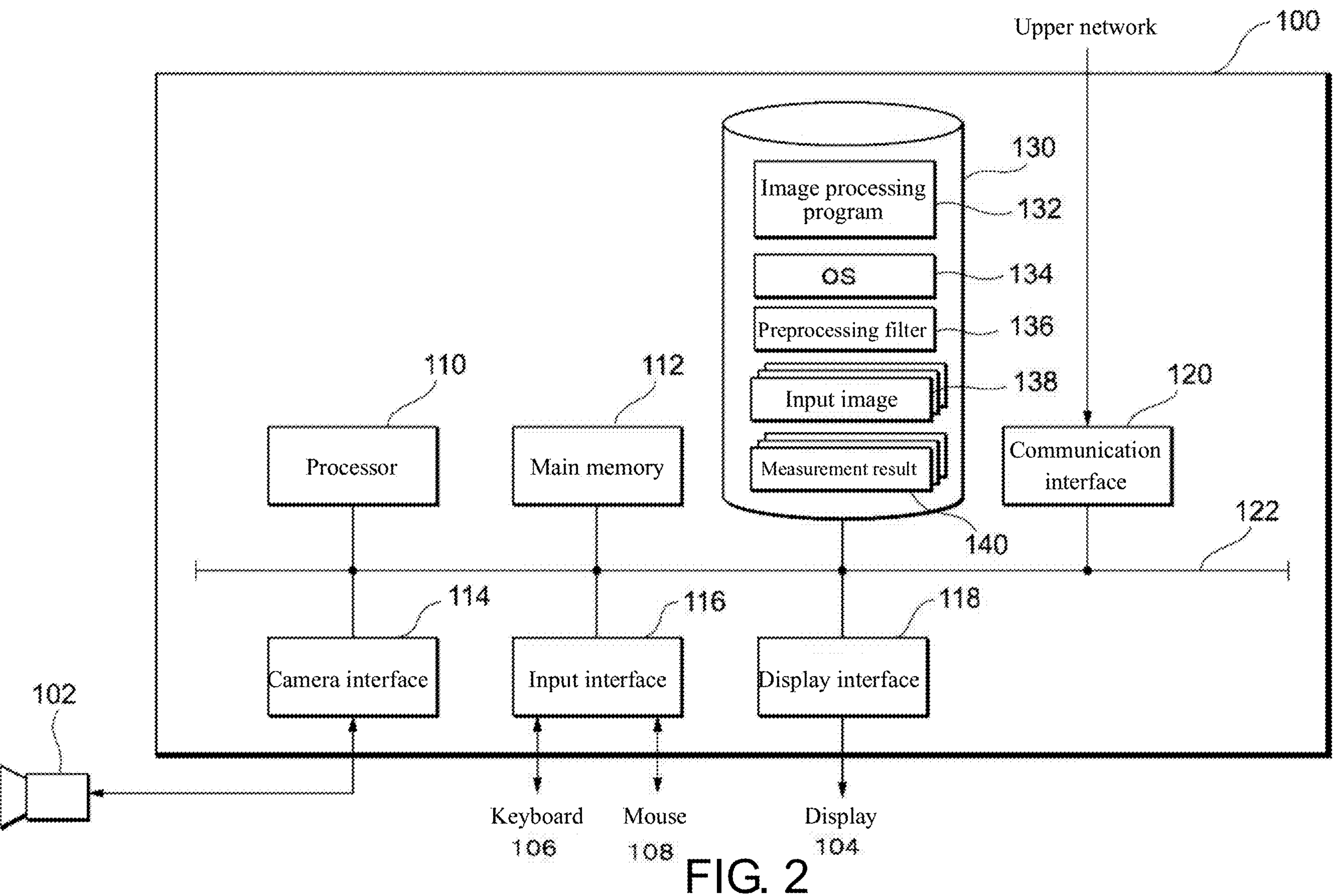
FIG. 2 is a schematic diagram showing a hardware configuration of a defect inspection apparatus according to the present embodiment.

FIG. 2 is a schematic diagram showing the hardware configuration of the defect inspection apparatus 100 according to the present embodiment. Referring to FIG. 2, as an example, the defect inspection apparatus 100 may be realized by using a general-purpose computer configured in accordance with a generic computer architecture. The defect inspection apparatus 100 includes a processor 110, a main memory (main memory section) 112, a camera interface 114, an input interface 116, a display interface 118, a communication interface 120 and a storage (auxiliary memory section) 130. These components are typically connected so as to communicate with one another via an internal bus 122. The main memory 112 and/or the storage 130 correspond to a memory section. The camera interface 114 corresponds to an acquisition section. The input interface 116 corresponds to an input section. The display interface 118 corresponds to a display section.

The processor 110 expands and executes a program stored in the storage 130 in the main memory 112, thereby realizing functions and processing as described later. The main memory 112 is composed of a volatile memory, and functions as a work memory required for execution of programs by the processor 110.

The camera interface 114 is connected to the camera 102 and acquires the input image taken by the camera 102. The camera interface 114 may indicate to the camera 102 an imaging timing and so on.

The input interface 116 is connected to the input section such as the keyboard 106 and the mouse 108, and acquires an order indicating an operation performed by the user on the input section, or the like.

The display interface 118 is connected to the display 104, and outputs to the display 104 various processing results generated by execution of programs by the processor 110.

The communication interface 120 is in charge of processing for communicating with the PLC 10 and the database apparatus 12 or the like via the upper network 8.

The storage 130 stores therein a program for causing a computer such as an image processing program 132 for realizing the CNN engine and an operating system (OS) 134 or the like to function as the defect inspection apparatus 100. The storage 130 may further store therein a preprocessing filter 136 for realizing the image measurement processing as described later, an input image 138 acquired from the camera 102 and a measurement result 140 obtained by the image measurement processing.

The image processing program 132 stored in the storage 130 may be installed in the defect inspection apparatus 100 via an optical recording medium such as a digital versatile disc (DVD) or the like or a semiconductor recording medium such as a universal serial bus (USB) memory or the like. Alternatively, the image processing program 132 may be downloaded from a server apparatus on a network or the like.

In the case where the defect inspection apparatus 100 is realized by using a general-purpose computer in this way, some of the functions according to the present embodiment may be realized by calling, from among software modules that the OS 134 provides, required software modules in a predetermined order and/or at a predetermined timing and processing the software modules. That is, the image processing program 132 according to the present embodiment may provide required functions by cooperating with an OS, without including all the software modules for realizing the functions according to the present embodiment.

The image processing program 132 according to the present embodiment may be provided by being incorporated as part of other programs. In that case, the image processing program 132 itself does not include the modules included in other programs to be combined as described above and executes processing in cooperation with the other programs. In this way, the image processing program 132 according to the present embodiment may be in the form of being incorporated into other programs.

FIG. 2 shows an example where the defect inspection apparatus 100 is realized by using a general-purpose computer. However, the disclosure is not limited thereto, and all or some of the functions of the defect inspection apparatus 100 may be realized by using a dedicated circuit (e.g., an application-specific integrated circuit (ASIC) or a field-programmable gate array (FPGA), etc.). Furthermore, an external apparatus connected via a network may be in charge of some processing.

<2. Functional Configuration of Defect Inspection Apparatus 100>

Figure 3:
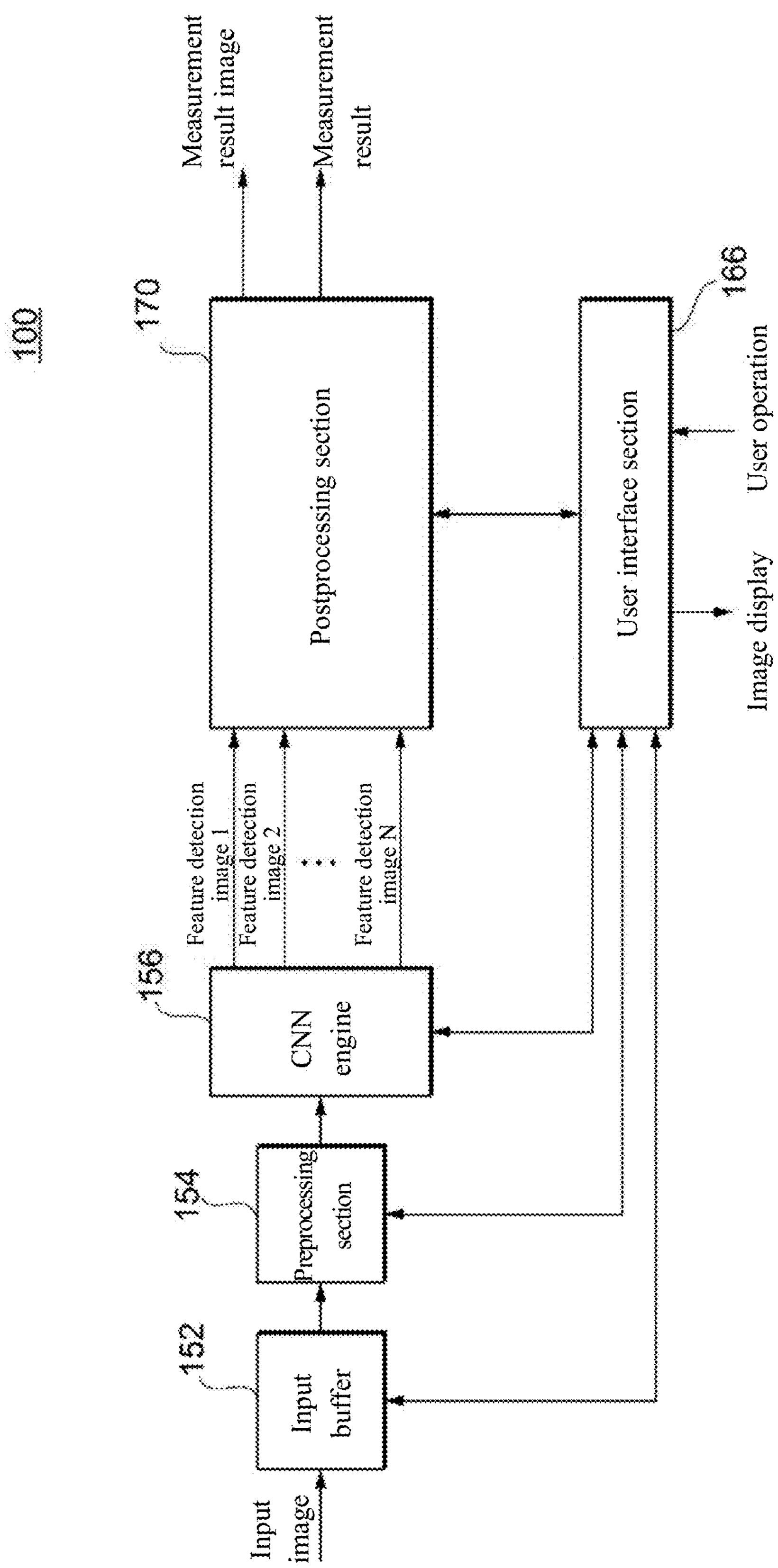
FIG. 3 is a schematic diagram showing a functional configuration of the defect inspection apparatus according to the present embodiment.
Figure 4:
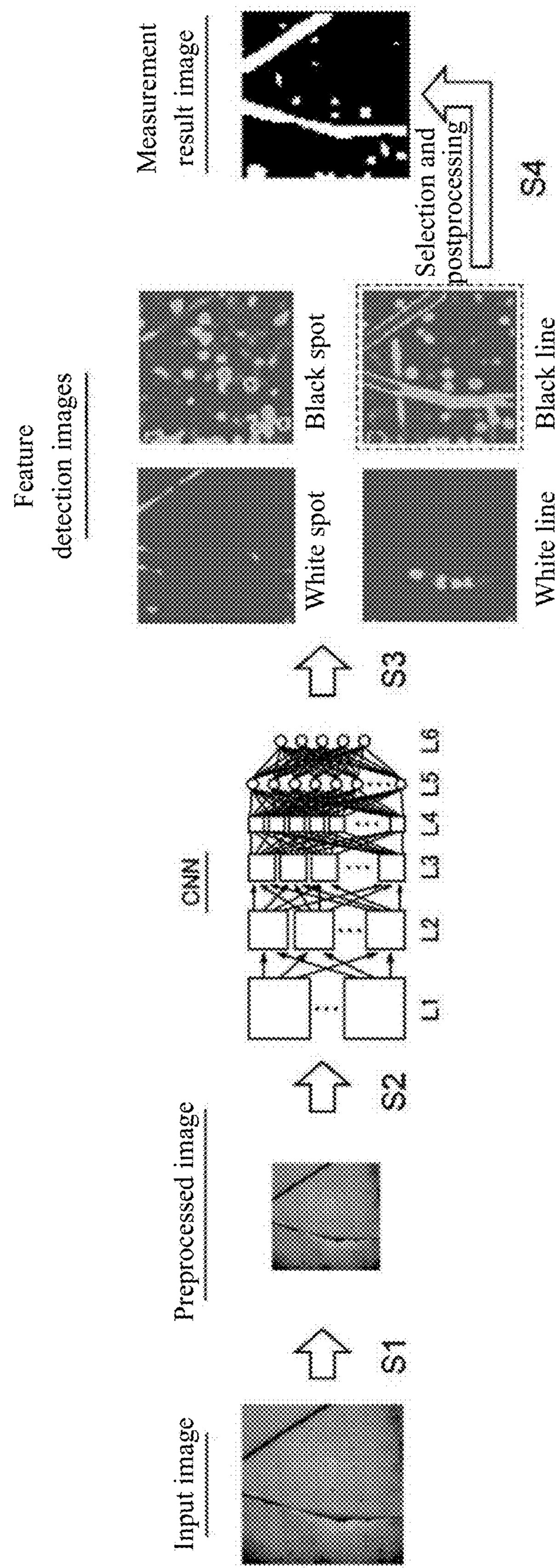
FIG. 4 is a diagram for explaining an example of a processing procedure of image measurement processing using a convolutional neural network (CNN) in the defect inspection system according to the present embodiment.

Next, referring to FIG. 3 and FIG. 4, a functional configuration of the defect inspection apparatus 100 included in the defect inspection system 1 according to the present embodiment is explained.

FIG. 3 is a schematic diagram showing the functional configuration of the defect inspection apparatus 100 according to the present embodiment. The functional configuration of the defect inspection apparatus 100 typically includes arithmetic processing realized by executing the image processing program 132 by the aforesaid processor 110. In addition. FIG. 4 is a schematic diagram for explaining an example of the inspection process (operation process) in the defect inspection apparatus 100 according to the present embodiment.

Referring to FIG. 3, the defect inspection apparatus 100 includes, as a functional configuration, an input buffer 152, a preprocessing section 154, a CNN engine 156, a postprocessing section 170 and a user interface section 166. Hereinafter, each functional section is explained in detail. Moreover, the CNN engine 156 and the postprocessing section 170 in FIG. 3 correspond to an inspection section.

(2-1. Input Buffer 152)

The input buffer 152 temporarily stores therein the input image taken by the camera 102. By the processor 110 storing the input image into the storage 130, the input buffer 152 is realized. The preprocessing section 154 and the user interface section 166 may access the input buffer 152.

(2-2. Preprocessing Section 154)

The preprocessing section 154 executes required preprocessing on the input image stored in the input buffer 152. The preprocessing section 154 according to the present embodiment generates a preprocessing filter in the preparation process. The preprocessing filter includes, for instance, a parameter (filter parameter) for converting the input image. Then, in the operation process, by applying the preprocessing filter generated in the preparation process to the input image as the preprocessing with respect to the input image, the input image is converted and a preprocessed image is generated (S1 in FIG. 4). Such preprocessing aims to process the input image so that a feature of a defect can be more reliably extracted in the CNN engine 156 at a subsequent stage. The content of the preprocessing may be specified by the user via the user interface section 166. The input image (preprocessed image) after preprocessing is output to the CNN engine 156 (S2 in FIG. 4). Moreover, details of the preprocessing filter generation processing and functions of the preprocessing filter are described later using FIG. 5 to FIGS. 7A and 7B.

(2-3. CNN Engine 156)

By applying the CNN engine 156 having a plurality of pre-learned classes to the input image, the CNN engine 156 provides a feature detection image generation function of respectively generating a plurality of feature detection images corresponding to the plurality of classes. More specifically, the CNN engine 156 has a pre-learned network so as to be able to perform classification into a predetermined number of classes, and outputs the feature detection images (feature detection image 1, feature detection image 2, . . . , and feature detection image N) corresponding to the respective classes (S3 in FIG. 4). In the example of FIG. 4, “white spot,” “black spot,” “white line” and “black line” are shown as four classifications (classes) of defects occurring in a workpiece. By inputting the input image taken by the camera 102 or the like to the CNN engine 156, feature detection images with feature values classified into these classes, i.e., "white spot," "black spot," "white line" and "black line," are respectively generated. The feature detection images shown in FIG. 4 are displayed in variable density so that the density of a region indicating each corresponding feature is larger as compared with other regions. Moreover, examples where the density is displayed larger as compared with other regions may include a mode in which the region is displayed lighter than the other regions or a mode in which the region is displayed darker than the other regions. However, the disclosure is not limited thereto and may be in any mode as long as a region indicating a predetermined feature is distinguishable.

By pre-learning, the CNN engine 156 obtains the internal parameter for detecting the feature detection image corresponding to each class. For instance, in the case where the class of "white line" or "black line" is detected, the internal parameter may be expressed in number of pixels of a width of a detectable defect. The internal parameter is obtained according to the type of the defect included in the learning image provided by pre-learning.

The feature detection images respectively generated by the CNN engine 156 are output to the postprocessing section 170 and can also be accessed from the user interface section 166.

(2-4. Postprocessing Section 170)

The postprocessing section 170 performs postprocessing on at least some of the feature detection images output from the CNN engine 156 and thereby generates a measurement result.

Specifically, in the present configuration example, the postprocessing section 170 selects, from among the feature detection images output from the CNN engine 156, one feature detection image considered the most proper, and executes postprocessing thereon, thereby outputting a measurement result image (S4 in FIG. 4).

For instance, in the example of FIG. 4, the feature detection image of "black line" is selected as the most proper feature detection image. However, in this example, a feature value equivalent to "black spot" also appears in the feature detection image of "black line." That is, a spotted feature portion appears commonly in both the feature detection image of "black line" and the feature detection image of "black spot." In contrast, a certain feature may appear in a split manner in feature detection images of a plurality of classes. Depending on the type or size of the feature included in such input image, pattern separation between a defect and a portion (e.g., background portion) other than the defect becomes difficult. In such a case where the same feature appears in feature detection images of a plurality of classes, the postprocessing section 170 is capable of only extracting a target feature by executing image arithmetic processing so as to subtract the feature appearing in one of the feature detection images from the other feature detection images.

In the present specification, the "image arithmetic processing" includes arbitrary mathematical processing including four arithmetic operations between corresponding pixels among a plurality of images. In the example shown in FIG. 4, by using a luminance value of each pixel constituting the feature detection image of "black line" and a luminance value of each pixel constituting the feature detection image of "black spot", processing that obtains a difference in luminance value for each pixel is executed.

Moreover, the image arithmetic processing is not limited to processing that subtracts a feature, but also includes, for instance, addition processing, and weighted subtraction processing, weighted addition processing and so on.

Furthermore, the postprocessing section 170 executes postprocessing including binarization processing on an arithmetic result image, thereby obtaining the measurement result image. In the measurement result image shown in FIG. 4, it is known that a feature that has appeared in the feature detection image of "black line" and that indicates "black spot" is deleted or reduced, and the feature (defect) included in the input image can be sufficiently extracted.

Moreover, the postprocessing section 170 may receive, from the user via the user interface section 166, the selection of the most proper feature detection image, or type of the image arithmetic processing to be executed, a threshold used for binarization processing and so on.

(2-5. User Interface Section 166)

When the preprocessing section 154 performs the preprocessing filter generation processing, the user interface section 166 receives from the user a designation of a region (hereinafter also "defective region") in the input image that includes a defect. In addition, the user interface section 166 receives a selection of the input image presented to the user.

Furthermore, the user interface section 166 presents (displays images) to the user via the display 104 the measurement result image generated by the image measurement processing and an image generated during the image measurement processing, and so on. Specifically, the user interface section 166 presents to the user at least one of the input image input to the defect inspection apparatus 100, the preprocessed image generated by the preprocessing section 154, at least some of the feature detection images generated by the CNN engine 156, and the measurement result generated by the postprocessing section 170 by performing postprocessing by using at least some of the feature detection images generated by the CNN engine 156.

Examples of user interface screens provided by the user interface section 166 are explained later using FIG. 8 and FIG. 9A to FIG. 9C.

<3. Preprocessing Filter Generation Processing>

Figure 5:
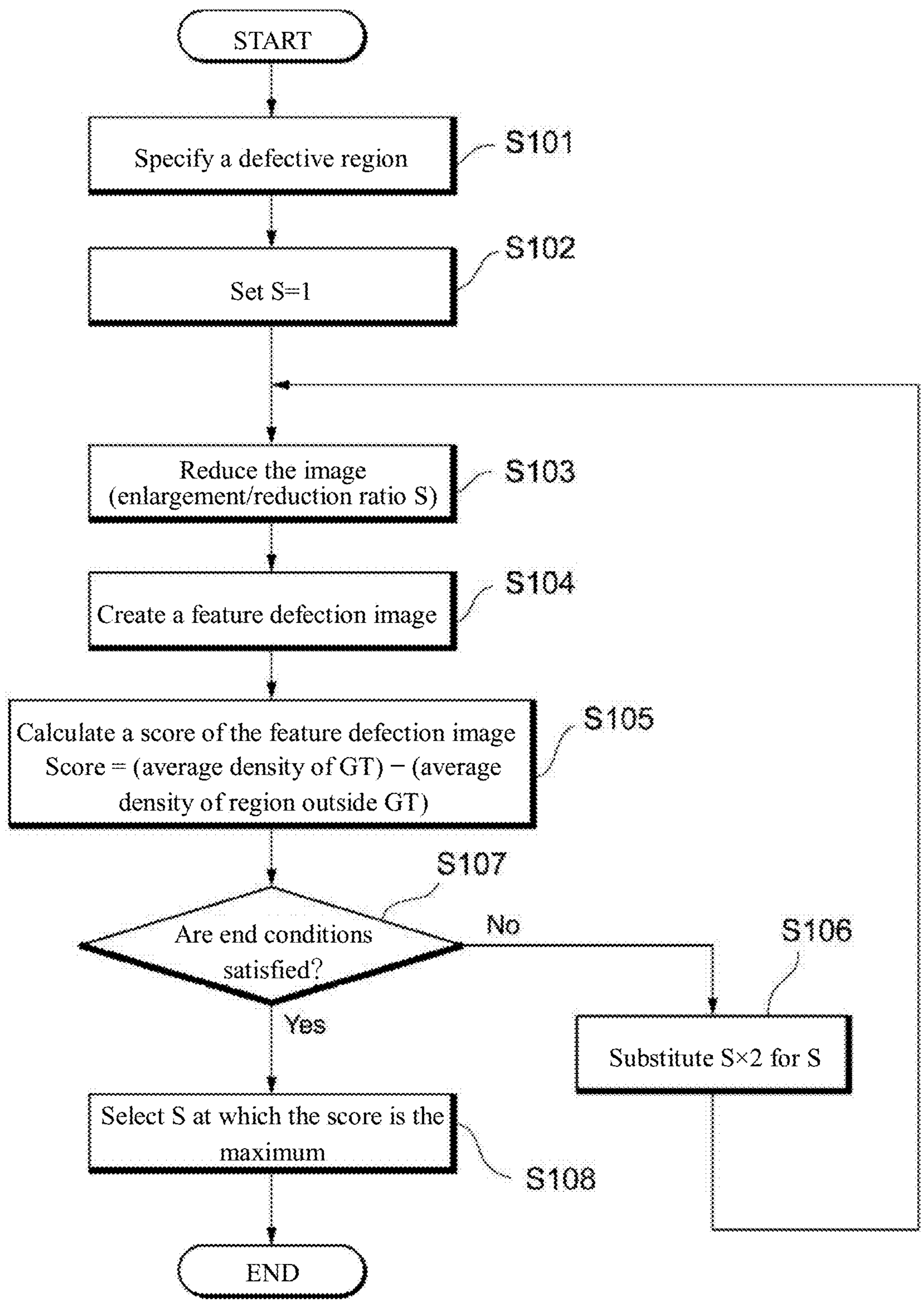
FIG. 5 is a flowchart for explaining an example of preprocessing filter generation processing in the defect inspection system according to the present embodiment.

Next, referring to FIG. 5, details of the preprocessing filter generation processing of the preprocessing section 154 are explained. FIG. 5 is a flowchart showing an example of a flow of the preprocessing filter generation processing. In the example of FIG. 5, a preprocessing filter converting the size (enlarging or reducing) of an input image is generated. However, the preprocessing filter generated by the preprocessing section 154 is not limited thereto, and a preprocessing filter converting the area or brightness or colorfulness of an image may be generated. The preprocessing filter generation processing is preferably performed in the aforesaid preparation process.

Prior to the preprocessing filter generation processing, first of all, from the input image input to the defect inspection apparatus 100, an image (hereinafter also "preprocessing image") for generating the preprocessing filter is selected by the user or the like. The preprocessing image is an image of an inspection object that includes a defect. Particularly desirably, the preprocessing image is an image of an inspection object that includes a defect of a size or type that cannot be detected using the internal parameter of the CNN engine 156 that has undergone learning, i.e., that includes a defect having a feature deviating from a feature value included in the CNN engine 156 that has undergone pre-learning.

Figure 6:
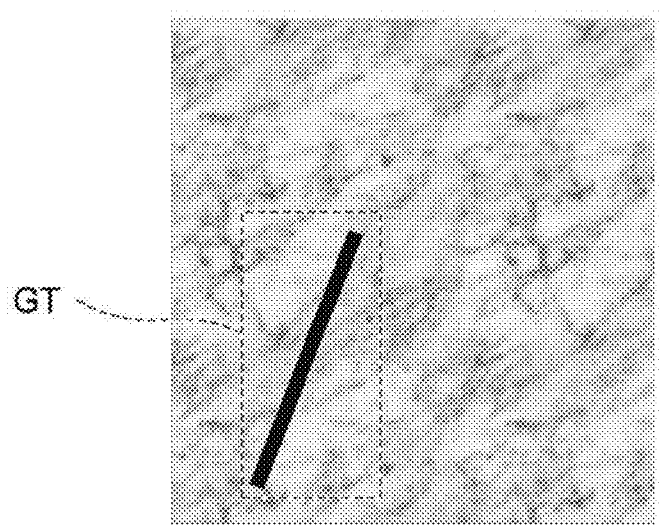
FIG. 6 is a diagram for explaining an example of the preprocessing filter generation processing in the defect inspection apparatus according to the present embodiment.

Next, the preprocessing section 154 receives a designation of the defective region with respect to the preprocessing image via the user interface section 166 (step S101). FIG. 6 is a diagram showing an example of the designated defective region. In FIG. 6, a rectangle GT corresponds to the defective region. Moreover, the defective region is not limited to being rectangular but may be of an arbitrary shape with area.

Referring back to FIG. 5, the continuation of the flow is explained. The preprocessing section 154 sets an enlargement/reduction ratio S to 1 as an initial value (step S102). Next, the preprocessing section 154 enlarges or reduces (hereinafter "changes") the preprocessing image by the enlargement/reduction ratio S (step S103), and generates a preprocessed image. Next, the preprocessing section 154 inputs, to the CNN engine 156, a portion of the changed image (preprocessed image) that includes at least the defective region. The CNN engine 156 creates a feature detection image from the input preprocessed image (step S104).

The preprocessing section 154 performs score calculation on the feature detection image created by the CNN engine 156 (step S105). Specifically, the preprocessing section 154 calculates, as a score, a difference between an average density of the feature detection image within the defective region and an average density of the feature detection image in a region (hereinafter also "background region") outside the defective region. As described above, the feature detection image is expressed by shading so that the density of a region indicating a feature corresponding to the internal parameter of the CNN engine 156 is larger as compared with other regions. Accordingly, in the case where the preprocessing image is changed by the proper enlargement/reduction ratio S and the feature of the defect is properly detected within the defective region (i.e., in the case where no defect is overlooked), the density within the defective region is increased. Meanwhile, in the case where no feature of the defect is detected outside the defective region (i.e., in the case where no excessive inspection occurs), the density outside the defective region is decreased. Moreover, although an example of using the whole region outside the defective region as the background region has been explained in the example shown in FIG. 5 and FIG. 6, the disclosure is not limited thereto. For instance, for cases such as where the background region has a predetermined pattern other than the defect, a previously designated region may be used as the background region, or, masking for excluding the predetermined pattern or the like included in the region other than the defect from a comparison object may be performed to set a specific region other than the defect as the background region.

Moreover, as described above, when the feature detection image output by the CNN engine 156 is classified into a plurality of classes, which class of the feature detection image the score is to be calculated based on is desirably designated by the user. However, the disclosure is not limited thereto. The preprocessing section 154 may calculate the score for the feature detection images of all the classes, and select the class in which the score becomes the maximum.

When the score is calculated, the preprocessing section 154 substitutes 2S for the enlargement/reduction ratio S (step S106). The preprocessing section 154 repeatedly executes the processing from the above steps S101 to S106 until predetermined end conditions are satisfied (step S107). For instance, in the case where the size of the preprocessing image is smaller than a predetermined area or where the score converges to a certain value, the preprocessing section 154 determines that the end conditions are satisfied (step S107: YES), gets out of the repeated processing and proceeds to the processing of step S108. In step S108, the preprocessing section 154 selects S at which the score becomes the maximum, and generates a preprocessing filter changing the input image by the selected S times (step S108).

Figure 7A:
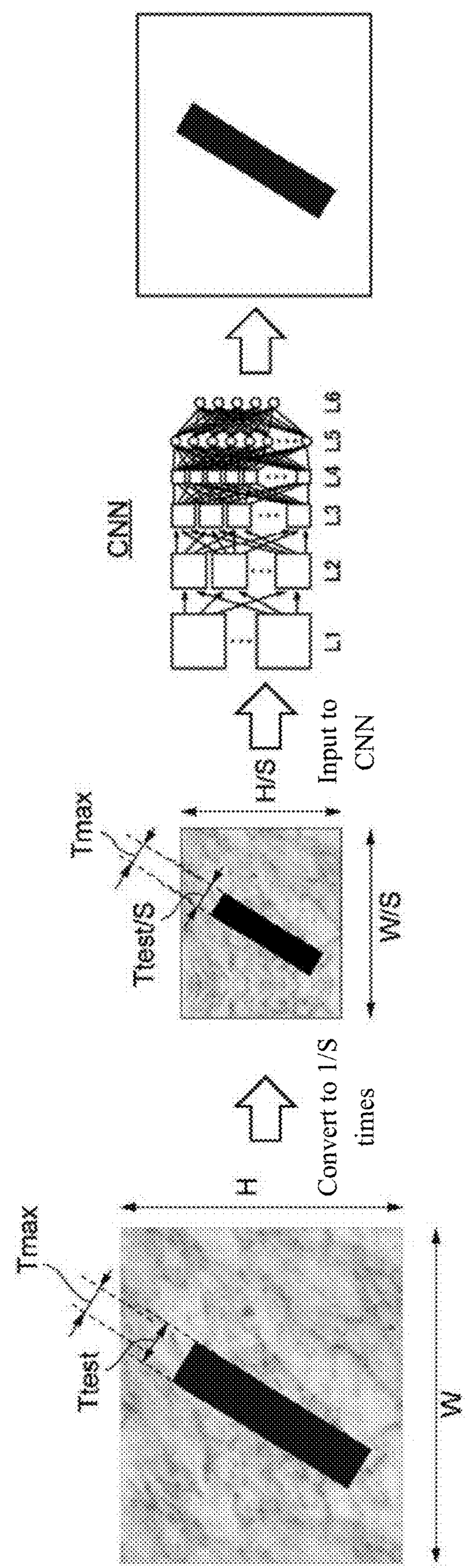
FIG. 7A is a diagram for explaining an example of a preprocessing filter in the defect inspection apparatus according to the present embodiment.
Figure 7B:
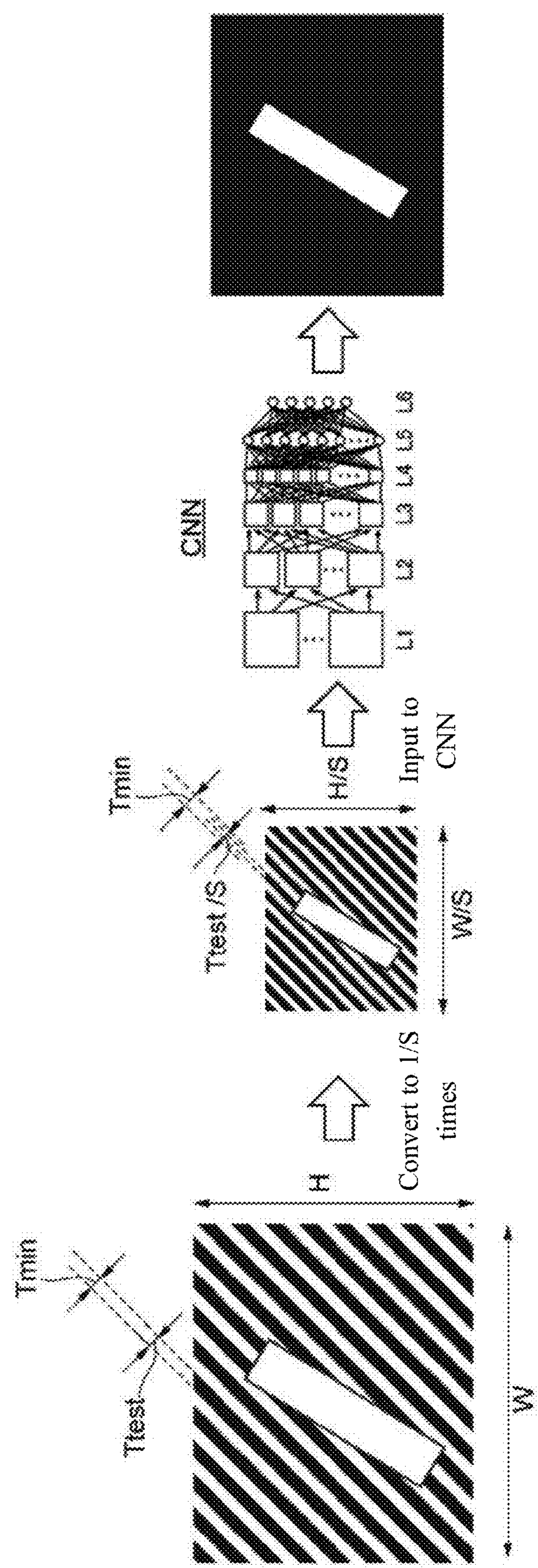
FIG. 7B is a diagram for explaining an example of the preprocessing filter in the defect inspection apparatus according to the present embodiment.

Herein, referring to FIG. 7A and FIG. 7B, usefulness of the thus-generated preprocessing filter is explained. In FIG. 7A and FIG. 7B, input images including defects having features respectively classified as "black line" and "white line" are explained as examples.

FIG. 7A is a schematic diagram for explaining the reason why, by applying the preprocessing filter, non-detection (overlooking of defects) can be prevented from occurring in the case where a feature value of the defect included in the input image deviates from the feature value that can be detected by a learned internal parameter.

In FIG. 7A, a width (Ttest) of a defect included in the input image deviates from a maximum value (Tmax) of the width that can be detected by the CNN engine 156 that has undergone learning. Accordingly, when the input image is input to the CNN engine 156 without being subjected to preprocessing, such input image cannot be properly classified.

In this case, the preprocessing section 154 applies a preprocessing filter reducing the size of the input image by the reduction ratio (enlargement/reduction ratio) S, thereby reducing the width (feature value) of the defect included in the preprocessed image to be less than the maximum value (Tmax) of the width (feature value) that can be detected by the CNN engine 156. Accordingly, by the CNN engine that has undergone learning, it becomes possible to detect the defect.

Meanwhile, FIG. 7B illustrates an example where false detection (excessive inspection) is prevented from occurring in the case where an image feature that is not a defect, such as background texture or the like, falls within the feature value that can be detected by the learned internal parameter. In the example of FIG. 7B, the width Ttest of the background texture falls within the range of the width that can be detected by the CNN engine 156 that has undergone learning (Tmin≤Ttest≤Tmax).

By the preprocessing section 154 applying the preprocessing filter enlarging or reducing the size of the input image by the reduction ratio (enlargement/reduction ratio) S, the width Ttest/S of the background texture included in the preprocessed image becomes less than Tmin. Accordingly, by the CNN engine that has undergone learning, it becomes possible to prevent false detection.

In this way, according to the defect inspection apparatus 100 according to the present embodiment, a preprocessing filter converting the input image is applied so that a defect can be properly detected using an internal parameter obtained by the CNN engine by pre-learning. Accordingly, the CNN engine that has undergone pre-learning can be improved in versatility, and can be flexibly utilized in various inspection objects or background images.

An example of changing the size of the input image has been explained in the present application example. However, the enlargement/reduction ratio S may be changed, so that, by enlarging the size of the input image, the width of the feature value of the defective region in the preprocessing image that includes the defect is included in the range of the feature value corresponding to the internal parameter, or so that, the width of the pattern in the background region in the preprocessing image deviates from the range of the feature value corresponding to the internal parameter.

<4. Examples of User Interface Screens>

Next, several examples of user interface screens provided by the defect inspection apparatus 100 according to the present embodiment are explained with reference to FIG. 8 and FIG. 9A to FIG. 9C.

Figure 8:
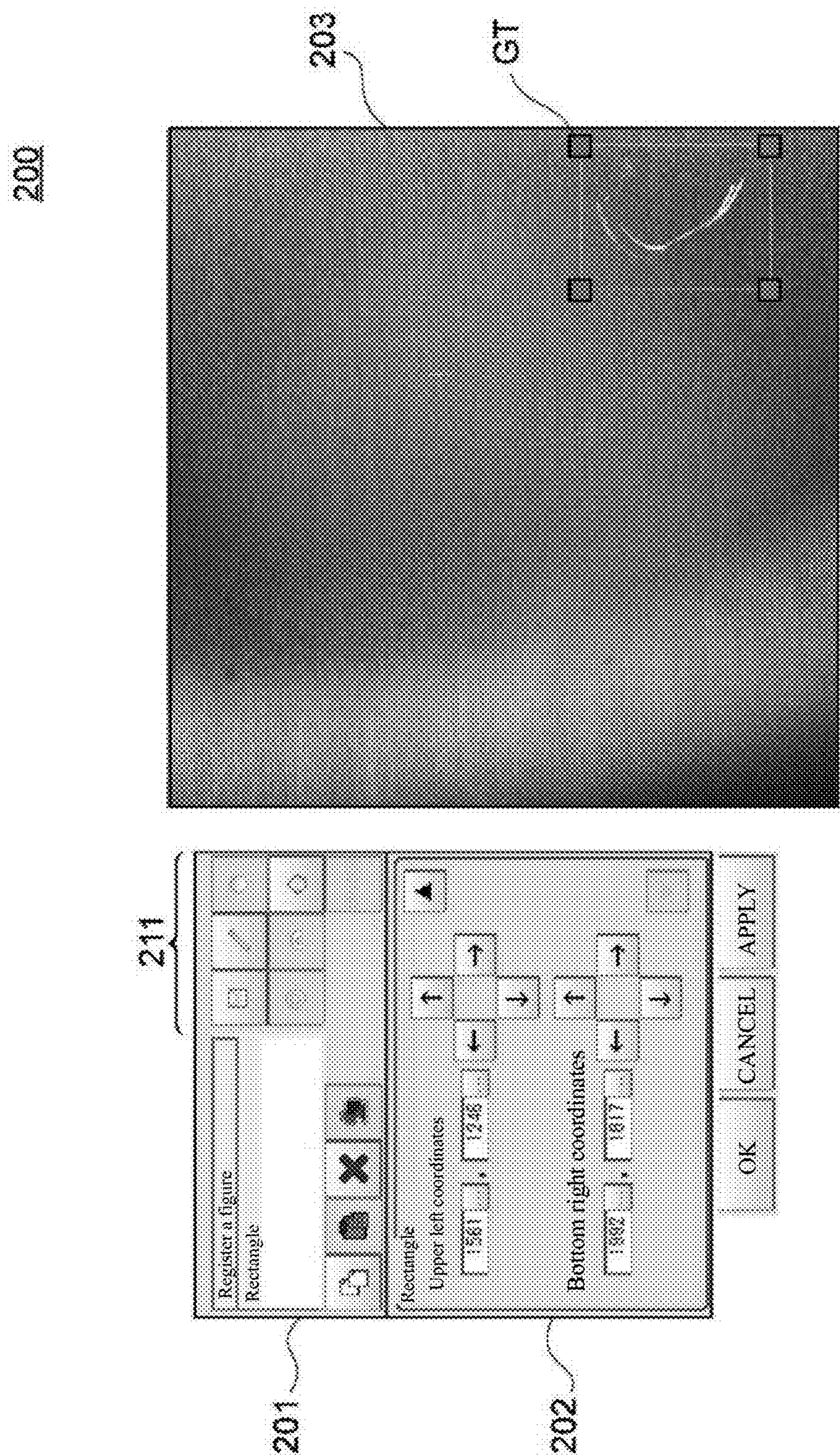
FIG. 8 is a schematic diagram showing an example of a user interface screen provided by the defect inspection apparatus according to the present embodiment.

FIG. 8 is a schematic diagram showing an example of a defective region input screen (a user interface screen 200) provided by the defect inspection apparatus 100 according to the present embodiment. In the example of FIG. 8, the user interface screen 200 has a figure registration region 201, a coordinates input region 202 and a display region 203.

The figure registration region 201 includes figure buttons 211. By selecting a figure button of a desired shape from the figure buttons 211, the user can select a figure specifying the defective region. In the example of FIG. 8, square, rectangle, circle, pentagon, circular arc, and concentric circle are displayed as the figure buttons 211. However, the disclosure is not limited thereto, and an arbitrary figure may be set. In addition, the method of selecting the figure is not limited to buttons but may be through a pull-down or a checkbox, a radio button and so on.

The coordinates input region 202 receives an input of coordinates of the defective region. In the example of FIG. 8, the user can designate a defective region GT by inputting the upper left coordinates and the bottom right coordinates of the defective region in the coordinates input region 202. The defective region GT designated by the user is displayed in the display region 203.

Moreover, the method of designating the defective region is not limited to the example of FIG. 8. For instance, the defective region may be configured to be input by directly drawing on an image displayed in the display region 203.

Figure 9A:
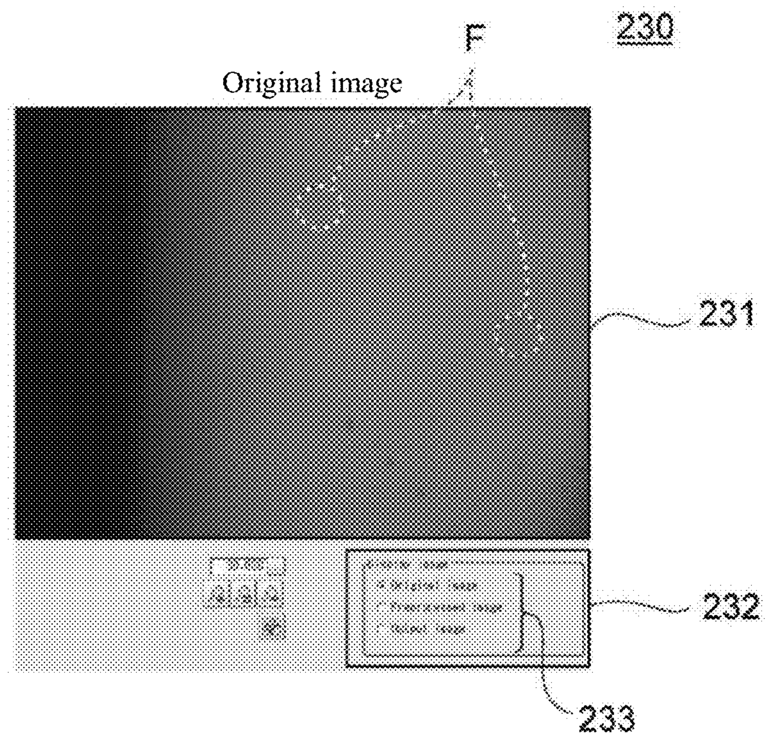
FIG. 9A is a schematic diagram showing an example of a user interface screen provided by the defect inspection apparatus according to the present embodiment.
Figure 9B:
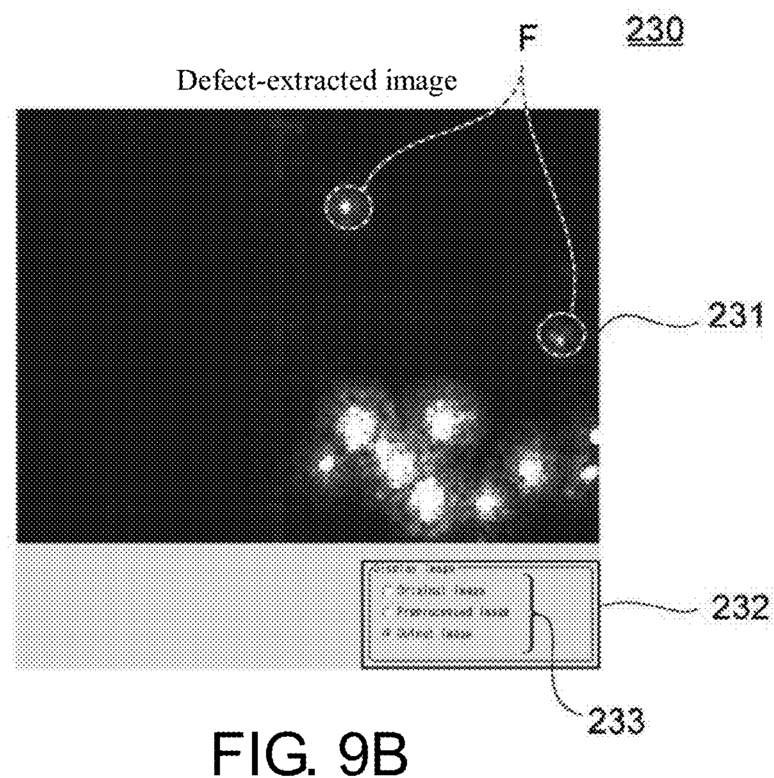
FIG. 9B is a schematic diagram showing an example of a user interface screen provided by the defect inspection apparatus according to the present embodiment.
Figure 9C:
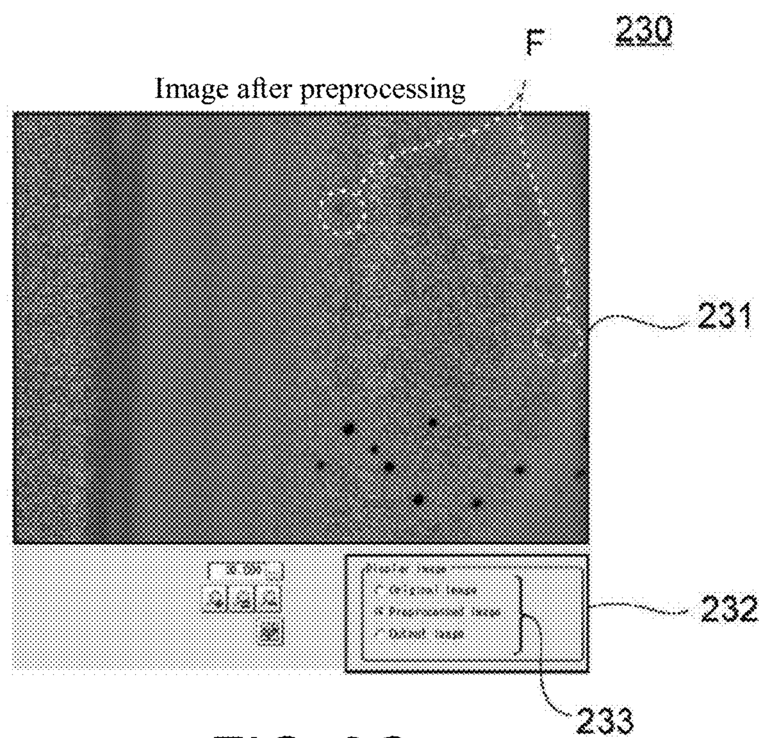
FIG. 9C is a schematic diagram showing an example of a user interface screen provided by the defect inspection apparatus according to the present embodiment.

FIG. 9A to FIG. 9C are schematic diagrams showing an example of a processing image display screen 230 provided by the defect inspection apparatus 100 according to the present embodiment. The processing image display screen 230 has a selection region 232 and an image display region 231.

The selection region 232 has a radio button group 233. The user performs a selection operation on the radio button group 233 to select the type of image to be displayed in the image display region 231. For instance, in the selection region 232, the image to be displayed in the image display region 231 can be selected from an original image (input image), an image (preprocessed image) after preprocessing, and a measurement result image.

FIG. 9A shows an example where the original image is displayed in the image display region 231. As shown in FIG. 9A, in the original image, defects in regions indicated by circles F cannot be visually recognized. Meanwhile, FIG. 9B shows an example where the measurement result image is displayed. In addition, FIG. 9C shows an example where the image (preprocessed image) after preprocessing is displayed. In the measurement result image, white spots are detected in the regions indicated by the circles F. Here, since thin spots are also displayed in the regions indicated by the circles F in the image (preprocessed image) after preprocessing, it is known that the white spots displayed in the circles F in the measurement result image are not defects but noise caused by preprocessing.

In this way, in the defect inspection apparatus 100 according to the present embodiment, by presenting the user an intermediate image (preprocessed image) after preprocessing, when the user confirms the measurement result image, they can grasp whether false detection of a defect is due to the CNN engine 156 or due to the noise caused by preprocessing.

§ 3 Operation Example

Next, an operation example in the defect inspection system 1 according to the present embodiment is explained. The preparation process for generating the preprocessing filter relating to the image measurement processing and the operation process actually imaging the object workpiece and executing the image measurement processing exist in the defect inspection system 1 according to the present embodiment. Moreover, a processing sequence of the preparation process and a processing sequence of the operation process can be selected by the user by using the aforesaid input section as a sequence input section. In addition, in the processing sequence of the operation process, according to the content of an inspection result (e.g., information of presence or absence of a defect, size of a region corresponding to the defect, position of the region and so on), processing that updates the set preprocessing filter may be executed. For instance, in the processing sequence of the operation process, in the case where an undetected defect has occurred a predetermined number of times, the filter parameter of the aforesaid preprocessing filter may be updated based on an image (hereinafter also "non-detection image") including the undetected defect.

Figure 10:
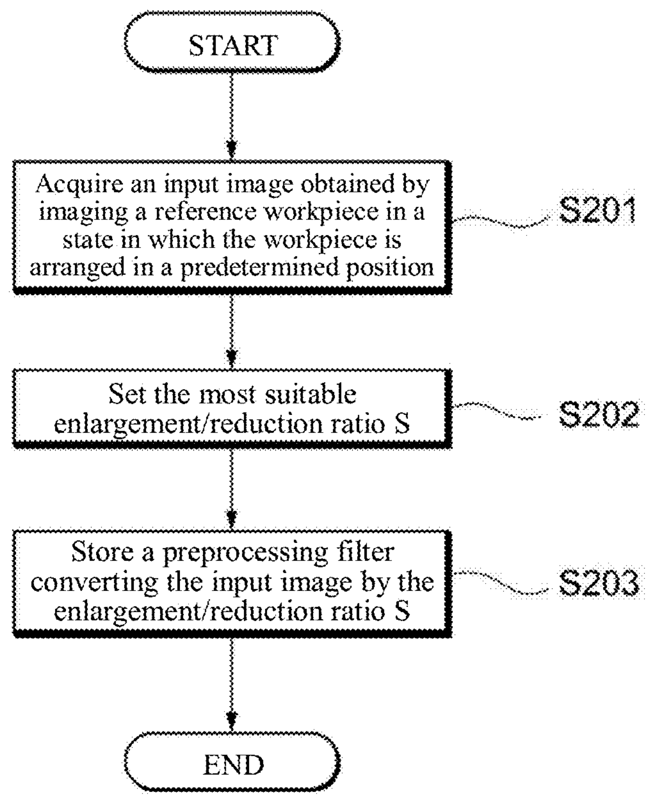
FIG. 10 is a flowchart showing a processing procedure of a preparation process in the defect inspection system according to the present embodiment.
Figure 11:
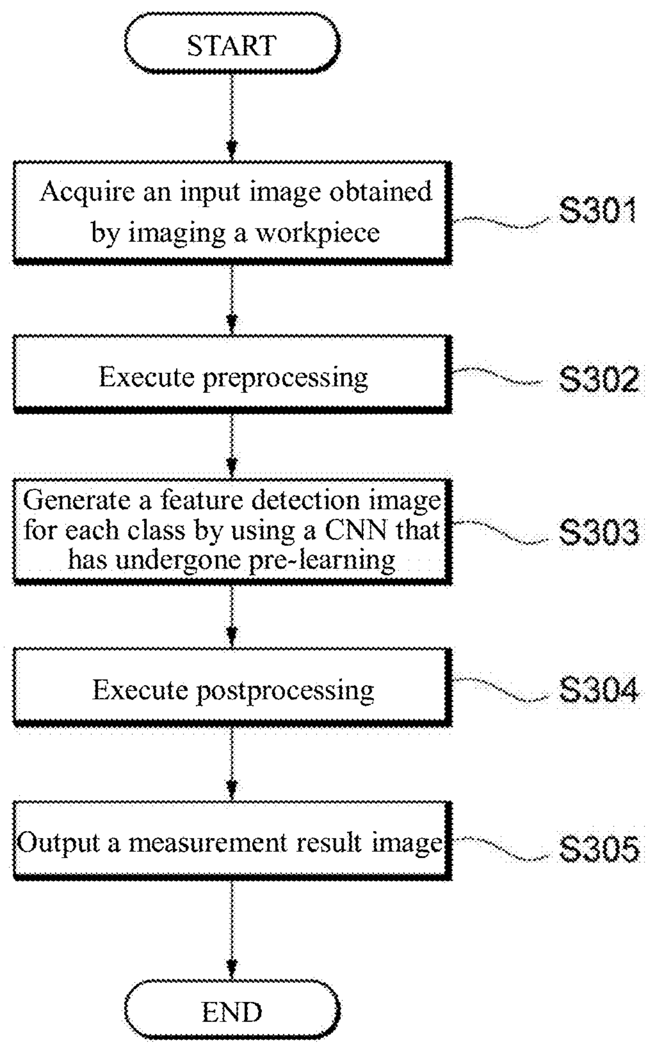
FIG. 11 is a flowchart showing a processing procedure of an operation process in the defect inspection system according to the present embodiment.

FIG. 10 is a flowchart showing a processing procedure of the preparation process in the defect inspection system 1 according to the present embodiment. FIG. 11 is a flowchart showing a processing procedure of the operation process in the defect inspection system 1 according to the present embodiment. Each step in the processing procedures shown in FIG. 10 and FIG. 11 is typically realized by executing the image processing program 132 or the like by the processor 110 of the defect inspection apparatus 100.

Referring to FIG. 10, in the preparation process, the defect inspection apparatus 100 acquires an input image obtained by imaging a workpiece serving as a reference of the image measurement processing by using the camera 102 in a state in which the workpiece is arranged in a predetermined position (step S201). At this moment, the input image (image data) generated by imaging the workpiece by the camera 102 is transferred to the defect inspection apparatus 100 and expanded in the main memory 112 of the defect inspection apparatus 100. Next, the defect inspection apparatus 100 uses the acquired input image to perform the aforesaid preprocessing filter generation processing and determines the enlargement/reduction ratio S at which the score becomes the maximum (step S202).

Furthermore, the defect inspection apparatus 100 generates a preprocessing filter for converting the input image by the determined enlargement/reduction ratio S and stores the preprocessing filter therein (step S203). Then, the processing in the preparation process is ended.

Referring to FIG. 11, in the operation process, when the workpiece serving as the inspection object arrives at the imaging visual field 6 of the camera 102, the defect inspection apparatus 100 acquires the input image obtained by imaging the workpiece by using the camera 102 (step S301). At this moment, the input image (image data) generated by imaging the workpiece by the camera 102 is transferred to the defect inspection apparatus 100 and expanded in the main memory 112 of the defect inspection apparatus 100.

Next, the defect inspection apparatus 100 executes preprocessing on the acquired input image (step S302). Furthermore, by using a CNN engine including an identifier having a CNN that has undergone pre-learning, the defect inspection apparatus 100 executes processing that extracts, from the input image after preprocessing, a feature for each of one or a plurality of classifications (classes). By this feature extraction processing, the defect inspection apparatus 100 generates a feature detection image for each of the one or plurality of classes (step S303).

Next, the defect inspection apparatus 100 executes post-processing to generate a measurement result image (step S304).

Finally, the defect inspection apparatus 100 outputs the generated measurement result image (step S305). A destination to which the measurement result image is output may be the display 104 or the like, or may be the PLC 10 and/or the database apparatus 12 connected via the upper network 8. Then, the processing in the operation process is ended. Moreover, the defect inspection apparatus 100 may output, instead of or together with the measurement result image, an inspection result containing at least information of whether or not a defect is included in the inspection object. The inspection result is sent to, for instance, a predetermined operation machine sorting the inspection object in the production line. Accordingly, the operation machine is capable of executing automatic sorting of the inspection object according to the inspection result.

Moreover, conditions for starting the processing procedure of the operation process shown in FIG. 11 may include any of a trigger signal from a timing sensor detecting the arrival of the workpiece, an execution start command from a higher level apparatus, and an instruction from the user.

<H. Effects>

In the defect inspection apparatus according to the present embodiment, the CNN engine having a plurality of pre-learned classes can be improved in versatility, and can be applied in the image measurement processing with respect to an arbitrary object to be inspected. In the case of using such a CNN engine that has undergone pre-learning, the feature value of the defect included in the actual inspection process may deviate from the feature value of the defect that can be detected by the internal parameter obtained by the CNN engine by the pre-learning.

Although it is also possible to take measures such as causing the CNN engine to re-learn according to the target object to be inspected, this is not a realistic measure in an application in which the target object to be inspected varies frequently. Therefore, in the present embodiment, the preprocessing filter converting the input image used in the actual inspection process is provided. Accordingly, the feature value of the defect included in the actual inspection process can be converted so as to be included in the range of the feature value that can be detected by the obtained internal parameter, and the CNN engine that has undergone pre-learning can be universally utilized.

In addition, in the defect inspection apparatus according to the present embodiment, the images generated during the image measurement processing can be presented to the user in a manner enabling comparison. For instance, the input image, the preprocessed image, the feature detection image and the measurement result image can be presented to the user.

By confirming such images generated in each process, in the case where a falsely detected defect is included in, for instance, the measurement result image, the user can specify the cause of the false detection.

§ 4 Modifications

The embodiments of the disclosure have been explained in detail as above. However, the above explanation is merely an example of the disclosure in all respects. It goes without saying that various improvements or modifications can be made without departing from the scope of the disclosure. For instance, the following changes are possible. Moreover, in the following, the same components as those in the above embodiments are denoted by the same reference numerals, and explanation of the same points as those in the above embodiments are omitted as appropriate. The following modifications may be properly combined.

For instance, in the previously described embodiments, an example has been explained where the preprocessing section 154 generates the preprocessing filter converting the size of the preprocessing image. However, the disclosure is not limited thereto. The preprocessing section 154 may generate a preprocessing filter for flattening brightness.

Figure 12:
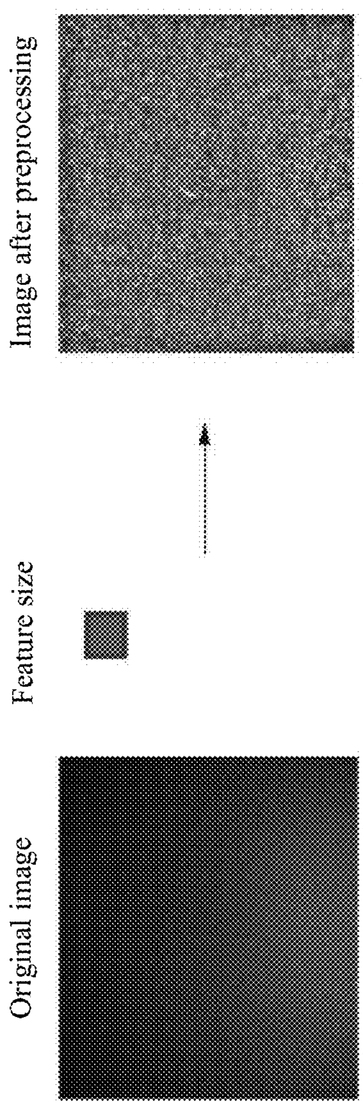
FIG. 12 is a diagram for explaining another example of the preprocessing filter generation processing in the defect inspection apparatus according to the present embodiment.
Figure 13:
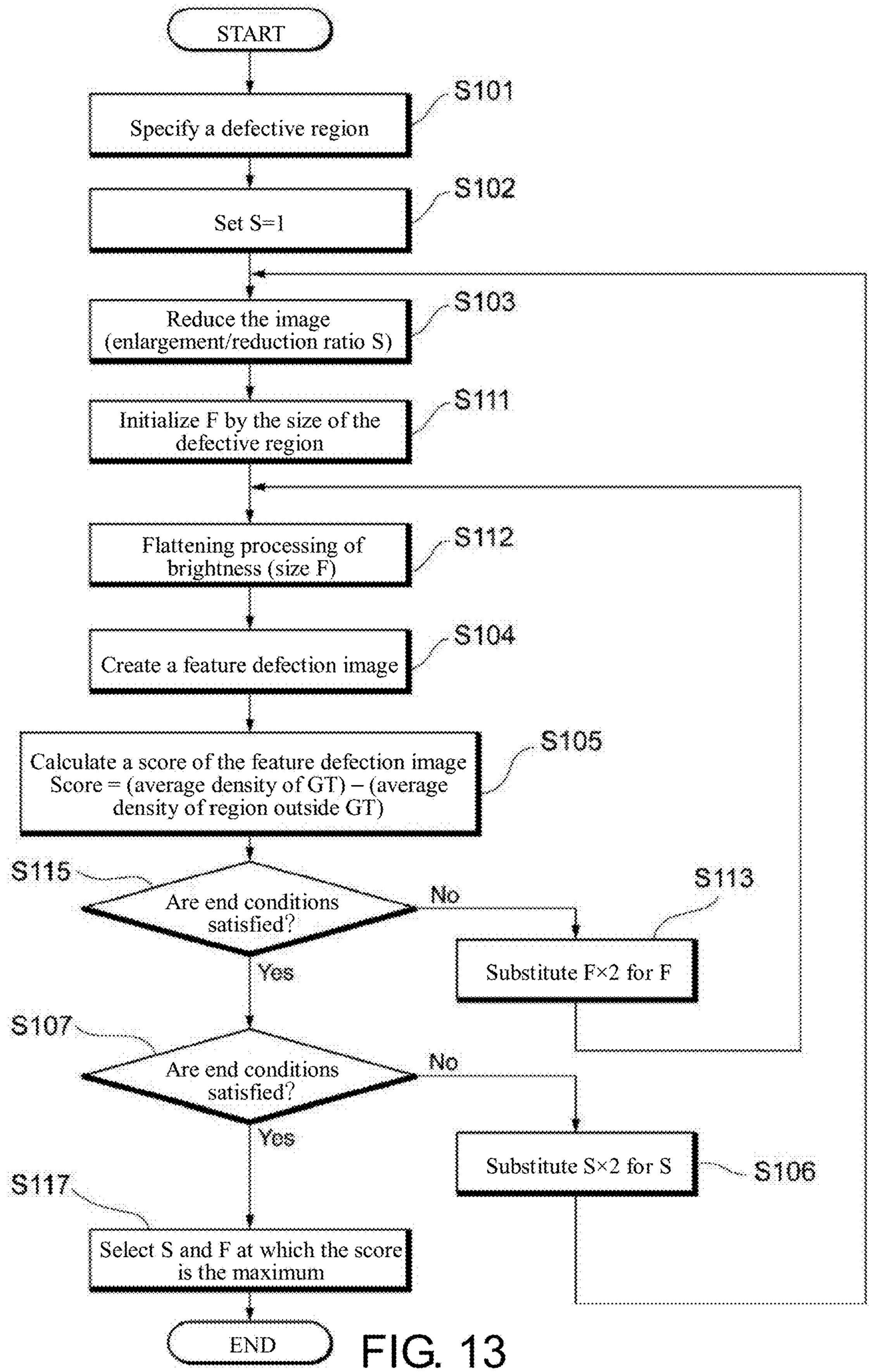
FIG. 13 is a diagram for explaining another example of the preprocessing filter generation processing in the defect inspection apparatus according to the present embodiment.

Referring to FIG. 12 and FIG. 13, processing that generates the preprocessing filter for flattening brightness is explained. FIG. 12 shows an example where preprocessing is applied to an original image of length x and width y so as to emphasize contrast of only a feature of a predetermined feature size (a square with a side equal to w). When the original image is represented by I and the image after preprocessing is represented by I', the preprocessing section 154 is capable of emphasizing contrast with respect to the feature of the predetermined size by using an algorithm shown in the following equation 1.

$$I'(x,y)=[I(x,y)-ave(x,y,w)-c\cdot\sigma(x,y,w)]/[2\cdot\sigma(x,y,w)] \quad \text{(equation 1)}$$

wherein, I'(x,y) represents the image after preprocessing;

I(x,y) represents the original image;

w represents the feature size;

c represents a contrast enlargement scale;

σ(x,y,w) represents a standard deviation within a rectangular region of the input image, centered at coordinates (x,y) and having a width/height of 2w+1;

ave(x,y,w) represents a mean within the rectangular region of the input image, centered at coordinates (x,y) and having a width/height of 2w+1.

FIG. 13 is a flowchart showing a modification of a flow of the preprocessing filter generation processing of the preprocessing section 154 that uses the above algorithm. Referring to FIG. 13, explanation is mainly given of a difference from the flowchart shown in FIG. 5.

In this example, the preprocessing section 154 enlarges or reduces the preprocessing image by a magnification S in the processing of step S103, and then initializes the feature size F by the size of the designated defective region (step S111). For instance, the preprocessing section 154 sets a mean value between height and width of the defective region to the feature size F.

Next, the preprocessing section 154 uses the algorithm of the above equation 1 to flatten brightness of the preprocessing image, and generates a preprocessed image (step S112). After that, similarly to the example of FIG. 5, the preprocessed image is input to the CNN engine 156, the feature detection image is created (step S104) and the score is calculated (step S105). After that, the preprocessing section 154 substitutes 2F for the feature size F (step S113), and repeatedly executes the processing of steps S112, S104, S105 and S113 until it is determined that the end conditions are satisfied (step S115). This processing is repeatedly executed until the predetermined end conditions with respect to each enlargement/reduction ratio S are satisfied (step S107: YES).

Accordingly, the preprocessing section 154 is capable of setting the enlargement/reduction ratio causing the score to become the maximum and the feature size in the preprocessing filter (step S117). The other configuration and effects are the same as those in the previously described embodiments.

Moreover, some or all of the above embodiments may also be described as in the following additional remarks, but are not limited thereto.

(Additional Remark 1)

A defect inspection apparatus is provided, including at least one memory and at least one hardware processor connected to the memory, wherein the memory stores a learned model and an internal parameter set in the learned model, wherein the hardware processor acquires an image of an inspection object photographed under predetermined conditions, generates a predetermined preprocessing filter according to a feature value in a preprocessing image being the acquired image of the inspection object that includes a defect and a feature value corresponding to the internal parameter, and generates a preprocessed image by applying the generated preprocessing filter to an inspection image being the acquired image of the inspection object and converting the inspection image, wherein the preprocessed image is inspected for presence or absence of the defect of the inspection object by using the stored learned model.

(Additional Remark 2)

A defect inspection method is provided, executing the following steps: by at least one or more hardware processors, storing a learned model and an internal parameter set in the learned model; acquiring an image of an inspection object photographed under predetermined conditions; generating a predetermined preprocessing filter according to a feature value in a preprocessing image of the inspection object that is acquired in the step of acquiring and that includes a defect, and a feature value corresponding to the internal parameter, and generating a preprocessed image by applying the generated preprocessing filter to an inspection image being the acquired image of the inspection object and converting the inspection image; and inspecting the preprocessed image for presence or absence of the defect of the inspection object by using the stored learned model.

What is claimed is:

1. A defect inspection apparatus, comprising:

a memory section, storing a learned model and an internal parameter set in the learned model;

an acquisition section, configured to acquire an image of an inspection object photographed under predetermined conditions;

a preprocessing section, generating a predetermined preprocessing filter according to a feature value in a preprocessing image being an image of the inspection object that is acquired by the acquisition section and that comprises a defect, and a feature value corresponding to the internal parameter, and generating a preprocessed image by applying the generated preprocessing filter to an inspection image being an image of the inspection object that is acquired by the acquisition section and converting the inspection image; and an inspection section, inspecting the preprocessed image for presence or absence of the defect of the inspection object by using the stored learned model, wherein the preprocessing section generates the preprocessing filter for converting the preprocessing image so that a width of the feature value of a defective region including the defect in the preprocessing image is comprised in a range of the feature value corresponding to the internal parameter.

2. The defect inspection apparatus according to claim 1, wherein the preprocessing section generates the preprocessing filter for converting the preprocessing image so that a width of a pattern of a background region other than the defective region in the preprocessing image deviates from the range of the feature value corresponding to the internal parameter.

3. The defect inspection apparatus according to claim 1, wherein the preprocessing section receives a designation of the defective region in the preprocessing image from outside and generates the preprocessing filter based on the received defective region.

4. The defect inspection apparatus according to claim 2, wherein the preprocessing section receives a designation of the defective region in the preprocessing image from outside and generates the preprocessing filter based on the received defective region.

5. The defect inspection apparatus according to claim 1, wherein the preprocessing section generates the preprocessing filter enlarging or reducing the preprocessing image based on the defective region.

6. The defect inspection apparatus according to claim 2, wherein the preprocessing section generates the preprocessing filter enlarging or reducing the preprocessing image based on the defective region.

7. The defect inspection apparatus according to claim 1, wherein the preprocessing section causes a portion of the preprocessing image that comprises at least the defective region to change according to a plurality of enlargement/reduction ratios and generates a feature detection image with respect to at least the portion;

the preprocessing section generates the preprocessing filter enlarging or reducing the preprocessing image according to the enlargement/reduction ratio when a difference between a density of the feature detection image within the defective region and a density of the feature detection image outside the defective region is the greatest when changing with the plurality of enlargement/reduction ratios;

wherein the feature detection image is displayed in variable density so that the density of a region indicating a feature corresponding to the internal parameter is larger as compared with other regions.

8. The defect inspection apparatus according to claim 2, wherein the preprocessing section causes a portion of the preprocessing image that comprises at least the defective region to change according to a plurality of enlargement/reduction ratios and generates a feature detection image with respect to at least the portion;

the preprocessing section generates the preprocessing filter enlarging or reducing the preprocessing image according to the enlargement/reduction ratio when a difference between a density of the feature detection image within the defective region and a density of the feature detection image outside the defective region is the greatest when changing with the plurality of enlargement/reduction ratios;

wherein the feature detection image is displayed in variable density so that the density of a region indicating a feature corresponding to the internal parameter is larger as compared with other regions.

9. The defect inspection apparatus according to claim 1, wherein the preprocessing section generates the preprocessing filter flattening brightness of the preprocessing image.

10. The defect inspection apparatus according to claim 9, further comprising a display section displaying the preprocessed image.

11. The defect inspection apparatus according to claim 10, wherein the display section displays the preprocessed image and a detection result image from which the defect is extracted in a manner enabling comparison.

12. The defect inspection apparatus according to claim 1, comprising:

an input section receiving a user selection of the preprocessing image used for generating the preprocessing filter from the image of the inspection object that is acquired by the acquisition section and that comprises the defect;

wherein the preprocessing section generates the predetermined preprocessing filter according to the feature value in the preprocessing image and the feature value corresponding to the internal parameter.

13. The defect inspection apparatus according to claim 1, comprising:

a sequence input section receiving a user selection of which of a plurality of processing sequences is to be executed, wherein the plurality of processing sequences comprise a preparation process sequence in which the preprocessing section generates the preprocessing filter and an operation process sequence in which the generated preprocessing filter is applied to the inspection image to inspect presence or absence of the defect comprised in the inspection object.

14. The defect inspection apparatus according to claim 13, wherein the operation process sequence executes a process that updates the preprocessing filter by the preprocessing section according to content of an inspection result regarding whether or not the defect of the inspection object can be identified.

15. A defect inspection method, wherein a computer executes steps of:

storing a learned model and an internal parameter set in the learned model;

acquiring an image of an inspection object photographed under predetermined conditions;

generating a predetermined preprocessing filter according to a feature value in a preprocessing image being an image of the inspection object that is acquired in the step of acquiring and that comprises a defect, and a feature value corresponding to the internal parameter, and generating a preprocessed image by applying the generated preprocessing filter to an inspection image being an image of the inspection object that is acquired in the step of acquiring and converting the inspection image; and inspecting the preprocessed image for presence or absence of the defect of the inspection object by using the stored learned model, wherein the preprocessing filter is generated for converting the preprocessing image so that a width of the feature value of a defective region including the defect in the preprocessing image is comprised in a range of the feature value corresponding to the internal parameter.

16. A non-transitory computer readable medium that stores a program, wherein a computer executes the program to:

store a learned model and an internal parameter set in the learned model;

acquire an image of an inspection object photographed under predetermined conditions;

generate a predetermined preprocessing filter according to a feature value in a preprocessing image being an image of the inspection object that is acquired by the unit for acquiring and that comprises a defect, and a feature value corresponding to the internal parameter, and for generating a preprocessed image by applying the generated preprocessing filter to an inspection image being an image of the inspection object that is acquired by the unit for acquiring and converting the inspection image; and inspect the preprocessed image for presence or absence of the defect of the inspection object by using the stored learned model, wherein the preprocessing filter is generated for converting the preprocessing image so that a width of the feature value of a defective region including the defect in the preprocessing image is comprised in a range of the feature value corresponding to the internal parameter.

* * * * *